Nov. 3, 1931.  C. M. JOHANNSEN  1,830,028
OAT HULLER
Filed April 21, 1930   2 Sheets-Sheet 1

Inventor
Christoph M. Johannsen
by Chung & Hague Attys

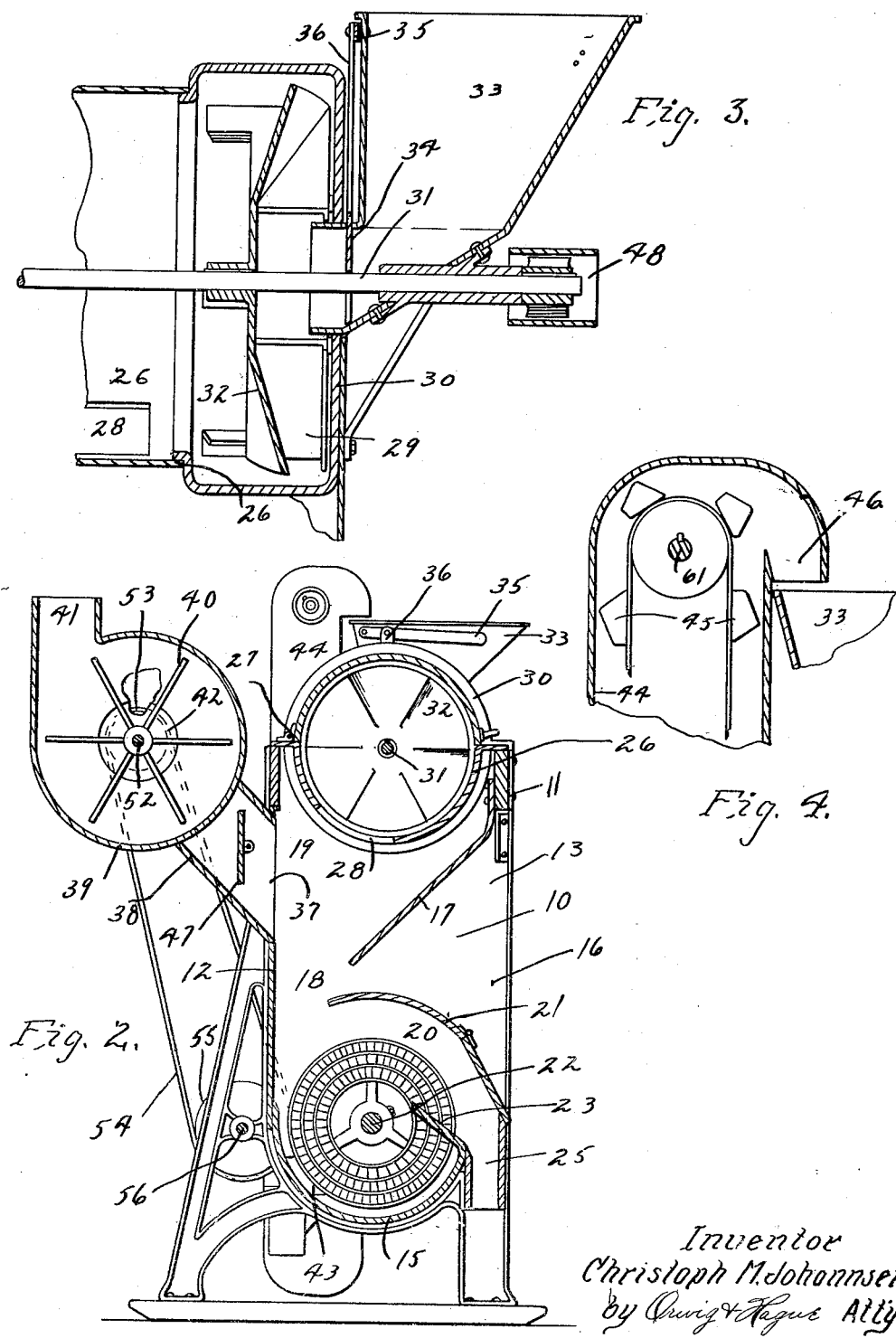

Patented Nov. 3, 1931

1,830,028

UNITED STATES PATENT OFFICE

CHRISTOPH M. JOHANNSEN, OF MARSHALLTOWN, IOWA

OAT-HULLER

Application filed April 21, 1930. Serial No. 445,972.

The object of my invention is to provide an oat huller of simple, durable and inexpensive construction, of compact form and so constructed and arranged that the hulling and cleaning operation is completed in one machine.

A further object is to provide in an oat huller improved means for separating the hulls from the hulled grain, and for separating the unhulled grain from the hulled grain.

More specifically it is the object of my invention to provide in an oat huller having a hulling element mechanism for separating the unhulled grain from the hulled grain and for simultaneously separating the hulls from the grain as it moves from the huller to said separating mechanism, and in connection therewith means for regulating the operation of the mechanism for separating the hulls from the grain, whereby the separation may be positively performed, and whereby the hulls will be entirely removed without carrying over a large percent of the lighter unhulled oats.

My invention consists in the construction, arrangement and combination of the various parts of the device, whereby the objects contemplated are attained, as hereinafter more fully set forth, pointed out in my claims, and illustrated in the accompanying drawings, in which:

Figure 2 is a vertical transverse sectional view of the same.

Figure 3 is an enlarged detail sectional view of the huller device.

Figure 4 is a sectional view of the upper end of the grain elevator.

Figure 1:
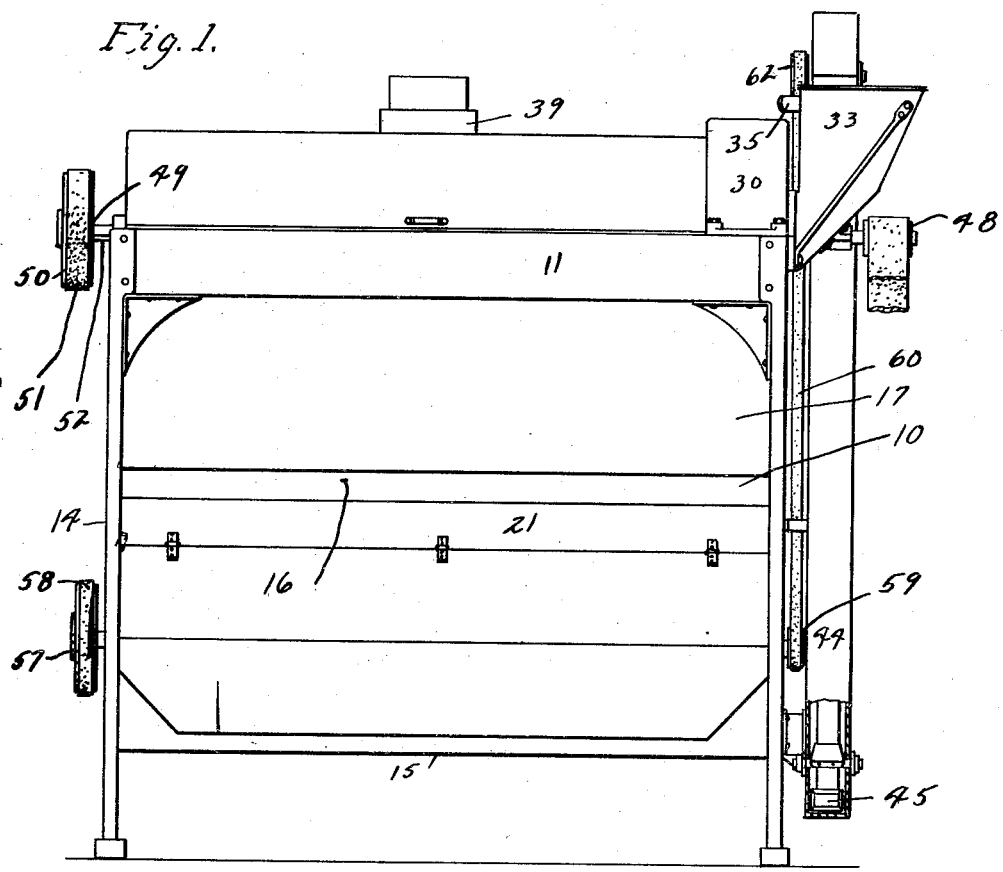
Figure 1 is a front view of my improved huller.
Figure 6:
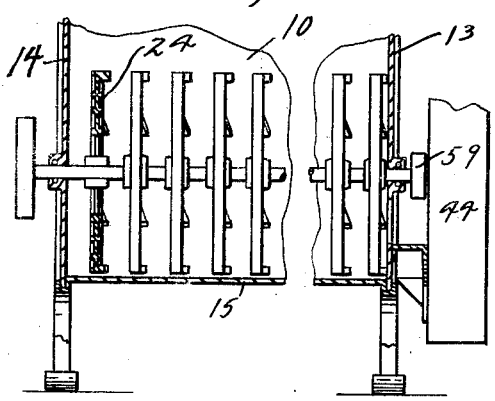
Figure 6 is a detail sectional view of the casing containing the separating device, showing the manner in which the separating disks are mounted therein, one of said disks being in section.
Figure 5:
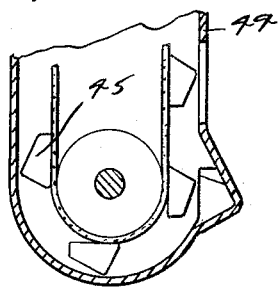
Figure 5 is a sectional view of the lower end of said elevator.

My improved huller comprises a casing 10 having a front member 11, a back member 12, and end members 13 and 14. The bottom 15 of the casing is preferably formed semi-cylindrical.

The front 11 is provided with openings 16. The upper edge of said openings terminates in a downwardly and inwardly inclined plate 17, terminating some distance from the back 12 to provide a passage 18 between the upper compartment 19 and the lower compartment 20 of said casing 10.

The bottom edge of the opening 16 is provided with an upwardly and inwardly curved partition 21, which serves as a top for the compartment 20.

Mounted in the end members 13 and 14 and extending longitudinally through the compartment 20 is a shaft 22 on which is mounted a series of separating disks 23, said disks being spaced apart a slight distance, and each provided with pockets 24 in its front and back surfaces, so arranged that kernels of hulled grain will be received in said pockets as the disks are rotated and delivered to an outlet passage 25 adjacent to one side of said disk. The disks are rotated in a clockwise direction, as illustrated in Figure 2. The separating disks are of ordinary construction and of themselves form no part of my present invention.

Supported in the upper end of the casing 10 is a cylindrical housing 26, the upper half of which is hinged to the lower half by means of hinges 27. The lower half of the casing 26 has a slot 28. Opposite one end of the casing 28 is a huller mechanism indicated generally by the numeral 29.

The huller comprises a casing 30 mounted adjacent to one end of the housing 26. Said casing has a shaft 31 which extends longitudinally through said casing. The shaft 21 is provided with a rotatively mounted huller element 32, similar to that illustrated and described in the application for Letters Patent filed by Simeon N. Tremper and myself, on January 8, 1929, Serial Number 331,075.

The casing 30 is provided with a hopper 33 for feeding the unhulled grain to the huller element 32. The said hopper is provided with a gate 34 by means of which the amount of grain delivered to the huller element may be regulated by means of a lever 35, one end of which is pivotally connected to the hopper 33. The lever is connected to the gate 34 by means of a link 36.

By this arrangement the grain being fed to the member 32 as it is rapidly rotated will be delivered longitudinally into the housing 26, and delivered through the opening 28 and downwardly through the passage 18 to the separating compartment 20 adjacent to the left hand edge of the disk 23, as illustrated in Figure 2, which will hereinafter be known as the receiving edge of the disk.

The back 12 is provided with a horizontal opening 37, the lower edge of which is located a slight distance above the lower edge of the inclined plate 17. Said opening 37 has an upwardly and backwardly extending spout 38 of a length substantially equal to the length of the casing 10.

Supported in the central portion of the upper end of the spout 38 is a fan casing 39 in which is mounted a fan 40. Said casing 39 is provided with a discharge opening 41 and also an inlet opening 42 at each end. Said openings 42 communicate with the interior of the spout 38 in such manner that as the fan 40 is rotated in a clockwise direction, as indicated in Figure 2, a current of air will be drawn inwardly through the openings 42 and discharged through the opening 41, the air being drawn into the spout 38 through the opening 37, a portion of which will enter between the inner ends of the plates 17 and 21, and a portion of which will enter through the discharge spout 25 into the separating compartment and be moved upwardly through the passage 18.

By drawing a portion of the air through the compartment 20, I have provided means whereby the dust and fine particles of hulls and chaff, which may be dislodged from the kernels of grain during agitation of the grain caused by the operation of the disks 23, will be drawn upwardly through the passage 18. The air entering through the compartment 20 and through the passage between the members 17 and 21 will pass upwardly through the downwardly moving column of grain from the opening 28, causing the separated hulls or chaff to be separated from the hulled and unhulled kernels of grain. The hulled grain is delivered through the passage 25, while the unhulled grain will be advanced endways of the bottom 15 and discharged through an opening 43 and delivered through the elevator casing 44.

The grain is then picked up by the bucket conveyor 45 and discharged through a spout 46 at the upper end of the elevator 44 into the hopper 33, so that the unhulled grain will again pass through the huller device 32.

For controlling the amount of air passing through the opening 37 I have provided in the spout 38 a damper 47, which may be adjusted at various angles to increase or decrease the size of the opening through which the air will pass to the fan 40, and thereby provide means for controlling the velocity of the air through the passage 18, and upwardly through the down falling grain, whereby the hulls may be separated from the light oats.

It will readily be seen that on account of the heavier hulls and the light oats being of substantially the same specific gravity, delicate adjustment of the velocity of the upwardly moving air is necessary. This is provided for in the damper 47.

By this arrangement it will be seen that I have provided a single fan which is adapted to create an air current for separating the hulls from the grain as it is being delivered from the huller to the separator, and at the same time separate dust and smaller particles of material from the separating chamber. If the entire volume of air were caused to pass through the separating chamber, then the action of the separating disks would be hindered, inasmuch as the grain would be blown from the pockets before it was delivered to the discharge spout 25.

It will further be seen that it is essential that the huller element, the separating element, and the fan be operated simultaneously at a fixed speed ratio relative to each other. To accomplish this I have provided on one end of the shaft 31 a drive pulley 48, by means of which power may be applied to the shaft 31 through a suitable belt. The opposite end of the shaft 31 is provided with a belt wheel 49, carrying a belt 50 also supported on a belt wheel 51 carried by one end of a fan shaft 52.

The opposite end of the fan shaft 52 is provided with a belt wheel 53 having a belt 54 operating on the belt pulley 55. Said pulley 55 is supported by a jack shaft 56 extending longitudinally of the back side of the casing 10. The opposite end of the jack shaft 56 is provided with a belt pulley 57 carrying a belt 58 mounted on one end of the shaft 22. This provides means for rotating the disk 23 at a comparatively slow speed.

The other end of the shaft 22 is provided with a belt wheel 59 carrying a belt 60 designed to drive the elevator shaft 61 by means of a pulley 62. Thus means is provided whereby the huller, separator fan and elevator are operated simultaneously and at fixed speed ratios relative to each other.

Thus it will be seen that I have provided an oat huller of simple, durable and inexpensive construction, and of compact form, so constructed and arranged that the entire hulling and cleaning operation will be completed in a single portable machine, and in which grain may be delivered in a completely hulled condition and thoroughly cleaned of chaff and dust.

I claim as my invention:

1. An oat huller comprising an upright casing having a downwardly and rearwardly extending plate to divide the casing into upper and lower compartments, said plate terminating short of the back of the casing to form a vertical passage between said compartments, a huller device adjacent to one end of the upper compartment designed to throw hulled grain horizontally into said upper compartment, a kernel separator in the bottom compartment, an exhaust fan in communication with the upper compartment, whereby air will be caused to move upwardly through said passage to cause chaff and hulls to be separated from the grain as it is delivered downwardly through said passage from the huller to the separator.

2. An oat huller comprising a casing, a huller element, means for feeding grain to said huller element, means for separating the unhulled kernels from the hulled kernels in the bottom of said casing, means for delivering hulled grain from said huller to said separating element, an exhaust fan for drawing air upwardly through the last said means, means for causing a portion of the air moved upwardly through said grain delivering means to travel through the compartment in which is located the kernel separator, and means for controlling the flow of air through said grain delivering means.

3. An oat huller comprising a casing, a huller element in the upper end of said casing, a separating element in the lower end of said casing, means for delivering grain downwardly from said huller element to said separator, means for causing air to move upwardly through said grain delivering means, means for simultaneously operating said huller element, said separator element and said air exhausting means at fixed predetermined speed ratios, and means for varying the flow of air through said grain delivering means, and means for causing a portion of the air delivered to said grain delivering means to be drawn through said separator.

4. An oat huller comprising an upright casing having a downwardly and rearwardly extending plate to divide the casing into upper and lower compartments, said plate terminating short of the back of the casing to form a vertical passage between said compartments, a huller device adjacent to one end of the upper compartment designed to throw hulled grain horizontally into said upper compartment, a kernel separator in the bottom compartment, a cover for said kernel separator terminating short of the back and below the outer edge of said rearwardly extending plate, an exhaust fan in communication with the upper compartment, whereby air will be drawn upwardly through the kernel separator, the space between said cover and plate and the first passage to cause chaff and hulls to be separated from the grain as it is delivered downwardly through said passage from the huller to the separator.

5. An oat huller comprising an upright casing having downwardly and rearwardly extending plate to divide the casing into upper and lower compartments, said plate terminating short of the back of the casing to form a vertical passage between said compartments, a huller device adjacent to one end of the upper compartment designed to throw huller grain horizontally into said upper compartment, a kernel separator in the bottom compartment, a fan casing adjacent to the upper end of the back of said huller, an air conductor communicating the interior of the fan casing with the interior of said upper compartment, a valve in said conductor whereby air will be caused to move upwardly through said passage and finally through said conductor to said fan, and to cause chaff and hulls to be separated from the grain as it is delivered downwardly through said passage to the huller from the separator.

6. An oat huller comprising an upright casing having a downwardly and rearwardly extending plate to divide the casing into upper and lower compartments, said plate terminating short of the back of the casing to form a vertical passage between said compartments, a huller device adjacent to one of the upper compartments designed to throw hulled grain horizontally into said upper compartment, a kernel separator in the bottom of said compartment comprising a shaft supporting a series of disks having pockets for separating the hulled kernels from the unhulled kernels, the inlet side of said kernel separator being beneath the lower end of said vertical passage, said kernel separator having a discharge opening on its opposite side, an exhaust fan in communication with the upper compartment whereby air will be caused to move upwardly through said passage and upwardly through said outlet passage for said kernel separator and over the top of said separating disks, whereby dust and small particles of chaff will be removed from the kernel separator, and whereby chaff and hulls will be separated from the grain as it is delivered downwardly through said passage from the huller to the separator.

CHRISTOPH M. JOHANNSEN.